(12) United States Patent
Chauhan et al.

(10) Patent No.: US 11,705,091 B2
(45) Date of Patent: Jul. 18, 2023

(54) PARALLELIZATION OF GPU COMPOSITION WITH DPU TOPOLOGY SELECTION

(71) Applicant: QUALCOMM Incorporated, San Diego, CA (US)

(72) Inventors: Sushil Chauhan, San Diego, CA (US); Mahesh Aia, San Diego, CA (US); Dileep Marchya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/449,630

(22) Filed: Sep. 30, 2021

(65) Prior Publication Data

US 2023/0096035 A1    Mar. 30, 2023

(51) Int. Cl.
*G09G 5/377* (2006.01)
*G06T 1/20* (2006.01)

(52) U.S. Cl.
CPC .............. *G09G 5/377* (2013.01); *G06T 1/20* (2013.01); *G09G 2360/18* (2013.01)

(58) Field of Classification Search
CPC ........... G09G 2340/10; G09G 2340/12; G09G 5/363; G09G 5/377; G09G 2352/00; G09G 5/026; G06T 1/20; G06T 15/503; G06T 2207/20221; G06T 7/194
See application file for complete search history.

(56) References Cited

U.S. PATENT DOCUMENTS

| 2013/0328922 | A1* | 12/2013 | Belanger ................. G06T 11/60 345/629 |
| 2017/0316541 | A1* | 11/2017 | Kim ........................ G06T 1/60 |
| 2018/0018936 | A1* | 1/2018 | Staudenmaier ...... G09G 3/2092 |
| 2019/0043248 | A1 | 2/2019 | Trandafir |
| 2022/0139017 | A1 | 5/2022 | Hu |

FOREIGN PATENT DOCUMENTS

| CN | 110363831 A | 10/2019 |
| WO | 2020190813 A1 | 9/2020 |

OTHER PUBLICATIONS

International Search Report and Written Opinion—PCT/US2022/043975—ISA/EPO—dated Dec. 22, 2022.

* cited by examiner

*Primary Examiner* — Hau H Nguyen
(74) *Attorney, Agent, or Firm* — Procopio, Cory, Hargreaves & Savitch

(57) ABSTRACT

This disclosure provides systems, devices, apparatus, and methods, including computer programs encoded on storage media, for parallelization of GPU composition with DPU topology selection. A processor may receive an indication of a plurality of application layers for composition at a first processor (e.g., a DPU) and a second processor (e.g., a GPU). The processor may select one or more first application layers of the plurality of application layers for attempted composition at the first processor and one or more second application layers of the plurality of application layers for composition at the second processor. The processor may transmit each of the one or more first application layers to the first processor for composition and each of the one or more second application layers to the second processor for composition.

30 Claims, 8 Drawing Sheets

PARALLELIZATION OF GPU COMPOSITION WITH DPU TOPOLOGY SELECTION

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address the ever more demanding CPU workload associated with display composition at higher refresh rates. There is a need for improved mixed mode composition techniques suitable for higher refresh rates that do not place an undue burden on CPU processing resources.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive an indication of a plurality of application layers for composition at a first processor and a second processor. The apparatus may select one or more first application layers of the plurality of application layers for attempted composition at the first processor and one or more second application layers of the plurality of application layers for composition at the second processor. The apparatus may transmit each of the one or more first application layers to the first processor for composition and each of the one or more second application layers to the second processor for composition. The first processor and the second processor may compose at least some of the one or more first application layers and at least some of the one or more second application layers in parallel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
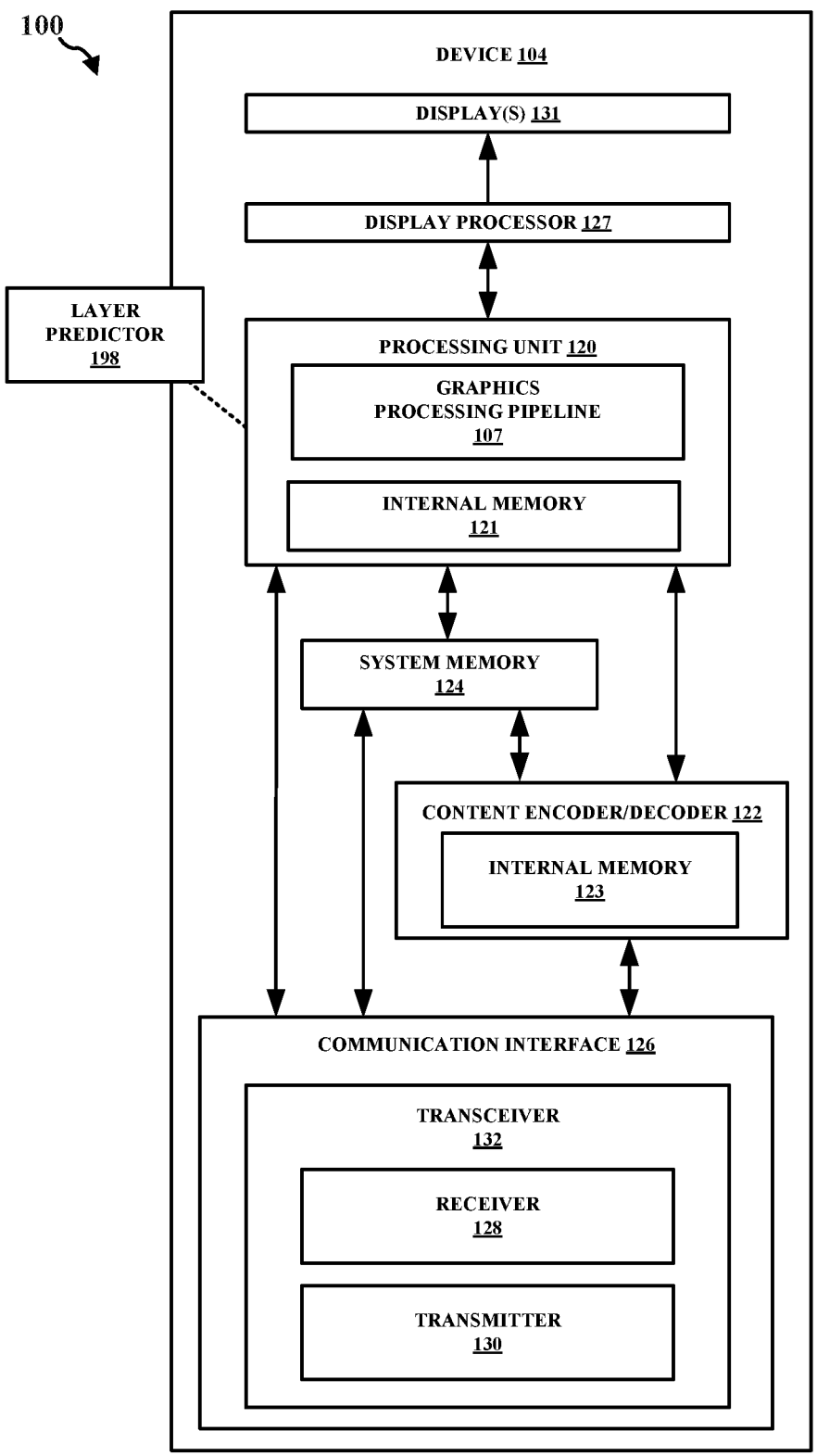
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A high refresh rate (HRR) display (e.g., a display at a refresh rate at or above 120 Hz) may be associated with tight latency constraints in deciding application layers eligible for overlay composition at the display processing unit (DPU), scheduling GPU composition for application layers that do not qualify for overlay composition at the DPU, and configuring the DPU hardware resources for the final composition. Composition of a first subset of application layers at the DPU and of a second subset of application layers at the GPU may be referred to as mixed mode composition. The latency constraints may be especially tight in cases of mixed mode composition at high refresh rates. Despite optimizations that target other parts of the display pipeline, the DPU topology selection and the GPU composition may still be serialized operations, and may be in the path that determines the longest total execution time.

Aspects described herein may relate to the parallelization, at the CPU, of DPU topology selection and GPU shader programming, so that the composition in the display pipeline may be completed faster to satisfy the ever tighter composition deadline, and the display may be scaled to even higher refresh rates. In different configurations herein, a DPU may refer to a display processor of any type (e.g., a dedicated DPU, a CPU, or a GPU performing display processing functions).

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a layer predictor 198 configured to receive an indication of a plurality of application layers for composition at a first processor and a second processor. The layer predictor 198 may be further configured to select one or more first application layers of the plurality of application layers for attempted composition at the first processor and one or more second application layers of the plurality of application layers for composition at the second processor. The layer predictor 198 may be further configured to transmit each of the one or more first application layers to the first processor for composition and each of the one or more second application layers to the second processor for composition. The first processor and the second processor can compose at least some of the one or more first application layers and at least some of the one or more second application layers in parallel.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
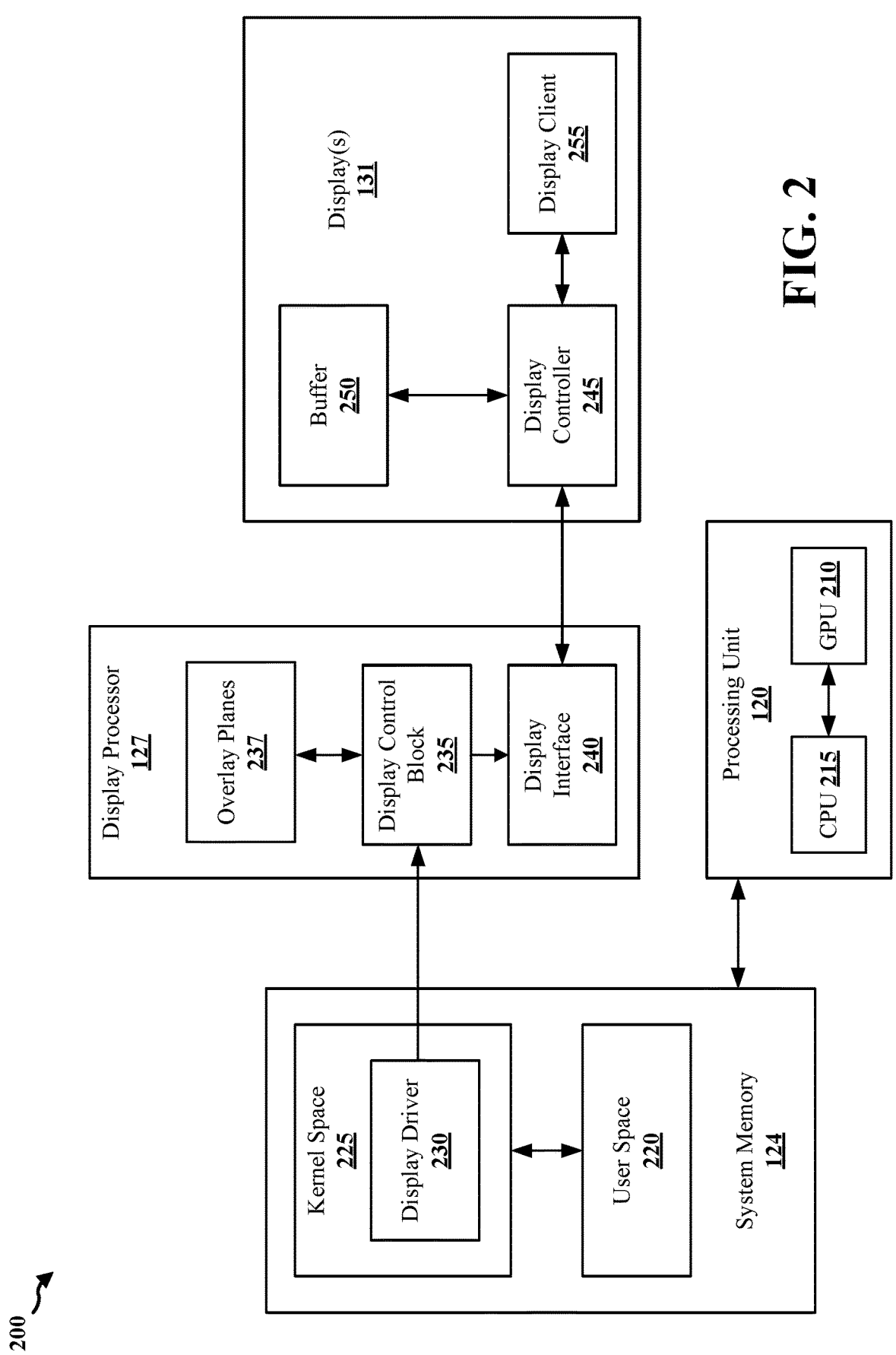
FIG. 2 is a block diagram that illustrates an example display framework.

FIG. 2 is a block diagram 200 that illustrates an example display framework including the processing unit 120, the system memory 124, the display processor 127, and the display(s) 131, as may be identified in connection with the exemplary device 104.

A GPU is generally included in devices that provide content for visual presentation on a display. For example, the processing unit 120 may include a GPU 210 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 210 may be controlled based on one or more graphics processing commands provided by a CPU 215. The CPU 215 may be configured to execute multiple applications concurrently. In some cases, each of the concurrently executed multiple applications may utilize the GPU 210 simultaneously. Processing techniques may be performed via the processing unit 120 output a frame over physical or wireless communication channels.

The system memory 124, which may be executed by the processing unit 120, may include a user space 220 and a kernel space 225. The user space 220 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 225 may further include a display driver 230. The display driver 230 may be configured to control the display processor 127. For example, the display driver 230 may cause the display processor 127 to composite one or more application layers at the overlay planes 237. Each of the overlay planes 237 may refer to a unit of display processor/DPU hardware resource. For example, a display processor 127 with 4 overlay planes may simultaneously blend 4 layers.

The display processor 127 includes a display control block 235 and a display interface 240. The display processor 127 may be configured to manipulate functions of the display(s) 131 (e.g., based on an input received from the display driver 230). For instance, the display control block 235 may be configured to receive instructions from the display driver 230 to, in cooperation with the overlay planes (e.g., DPU overlay planes) 237, composite one or more application layers. In some examples, the display control block 235 may additionally or alternatively perform post-processing of image data provided based on execution of the system memory 124 by the processing unit 120.

The display interface 240 may be configured to cause the display(s) 131 to display image frames. The display interface 240 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 250.

Frames are displayed at the display(s) 131 based on a display controller 245, a display client 255, and the buffer 250. The display controller 245 may receive image data from the display interface 240 and store the received image data in the buffer 250. In some examples, the display controller 245 may output the image data stored in the buffer 250 to the display client 255. Thus, the buffer 250 may represent a local memory to the display(s) 131. In some examples, the display controller 245 may output the image data received from the display interface 240 directly to the display client 255.

The display client 255 may be associated with a touch panel that senses interactions between a user and the display(s) 131. As the user interacts with the display(s) 131, one or more sensors in the touch panel may output signals to the display controller 245 that indicate which of the one or more sensors have sensor activity, a duration of the sensor activity, an applied pressure to the one or more sensor, etc. The display controller 245 may use the sensor outputs to determine a manner in which the user has interacted with the display(s) 131. The display(s) 131 may be further associated with/include other devices, such as a camera, a microphone, and/or a speaker, that operate in connection with the display client 255.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 210 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

A high refresh rate (HRR) display (e.g., a display at a refresh rate at or above 120 Hz) may be associated with tight latency constraints in deciding application layers eligible for overlay composition at the DPU, scheduling GPU composition for application layers that do not qualify for overlay composition at the DPU, and configuring the DPU hardware resources for the final composition. Composition of a first subset of application layers at the DPU and of a second subset of application layers at the GPU may be referred to as mixed mode composition. The latency constraints may be especially tight in cases of mixed mode composition at high refresh rates.

Currently, processing twelve layers or more in mixed mode composition at the 120 Hz refresh rate may saturate efficiency cores at the CPU. The display pipeline may be unable to keep up with the composition deadline for each draw cycle. As to the 240 Hz refresh rate, the total latency budget may be further reduced to one half of that associated with the 120 Hz refresh rate, yet the workload on the CPU associated with programming the GPU command stream may further increase as the GPU composition load further increases as a result of more applications layers falling back to the GPU due to application layer splitting across multiple overlay planes. This may further challenge the ability of the display pipeline to keep up with the composition deadline.

Figure 3:
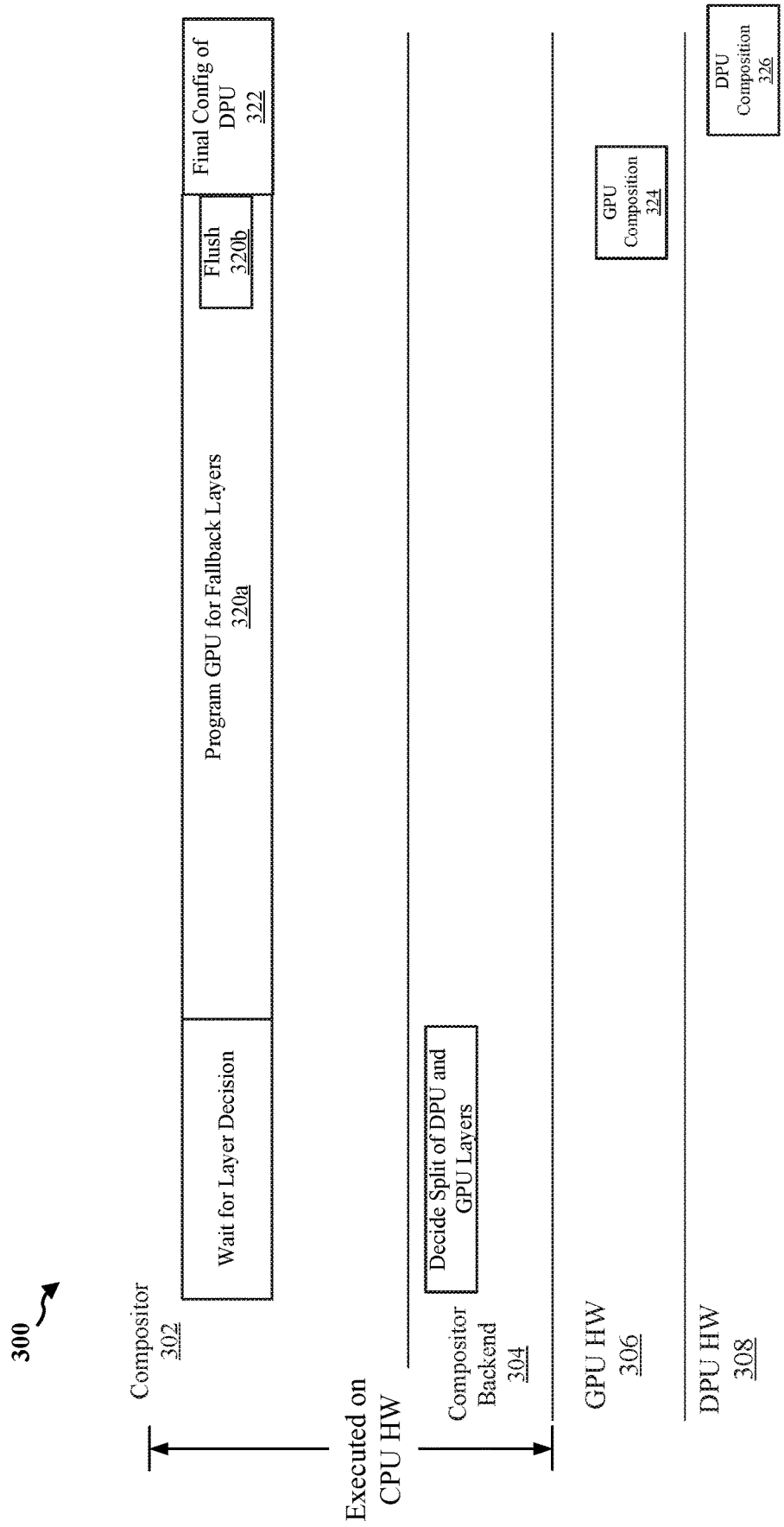
FIG. 3 is a diagram illustrating display composition in a display pipeline in accordance with one or more techniques of this disclosure.

FIG. 3 is a diagram 300 illustrating display composition in a display pipeline. A compositor 302 may be an operating system component responsible for composition or blending of the layers with the use of DPU and/or GPU hardware. A compositor backend 304 may be a vendor specific software implementation of an interface component that interfaces with the DPU. The compositor backend 304 may decide the split of application layers for composition at the DPU and at the GPU, as described in further detail below. The mixed mode composition layer splitting decision may be made in a definitive manner. In other words, the application layers may be split based on a definitive algorithm that may in one pass correctly split the application layers into application layers for DPU processing and application layers for GPU processing. The mixed mode composition layer splitting operation may be associated with linear complexity with respect to the number of application layers (An application layer may refer to an application user interface (UI) element that is visible on the screen at a given time, e.g., a Status Bar, a Navigation Bar, an Image Wallpaper, or a Launcher are visible application layers on a home screen). In other words, the running time associated with the mixed mode composition layer splitting operation may increase linearly as the number of the application layers increases. As the display refresh rate increases, the CPU workload associated with the layer splitting operation increases accordingly. Furthermore, despite optimizations that target other parts of the display pipeline (e.g., consolidation of layer selection, commits with a futuristic fence, etc.), the DPU topology selection and the GPU composition may still be serialized operations, and may be in the path that determines the longest total execution time. As illustrated, at the compositor 302, the programming 320a of the GPU shader for the fallback layers (i.e., the layers that cannot be composited at the DPU 308 and are to be composited at the GPU 306) and the final configuration 322 of the DPU may take place in series. The composition 324 at the GPU 306 and the composition 326 at the DPU 308 may take place largely in series as well (The GPU composition 324 may (subject to a delay) start after the compositor 302 issues the flush command 320b, and the DPU composition 326 may (subject to a delay) start after the compositor 302 has started the final configuration 322 of the DPU hardware 308).

Aspects described herein may relate to the parallelization, at the CPU, of DPU topology selection and GPU shader programming, so that the composition in the display pipeline may be completed faster to satisfy the ever tighter composition deadline, and the display may be scaled to even higher refresh rates.

In one or more aspects, a parallelized model may be implemented including using batch prediction heuristics at the CPU to select contiguous batches of application layers suitable for composition at the DPU and at the GPU. The DPU may be power efficient, but may be limited in its capability. Some application layers may be unsupported for composition at the DPU. For example, application layers including an invalid rotation (e.g., a rotation that is not 90 degrees, 180 degrees, or 270 degrees, etc.) may be unsupported for composition at the DPU. In another example, a shadow layer may also be unsupported for composition at the DPU because it may contain content dynamically generated at runtime. On the other hand, the GPU may be more versatile. However, the GPU may be less energy efficient than the DPU.

Figure 4:
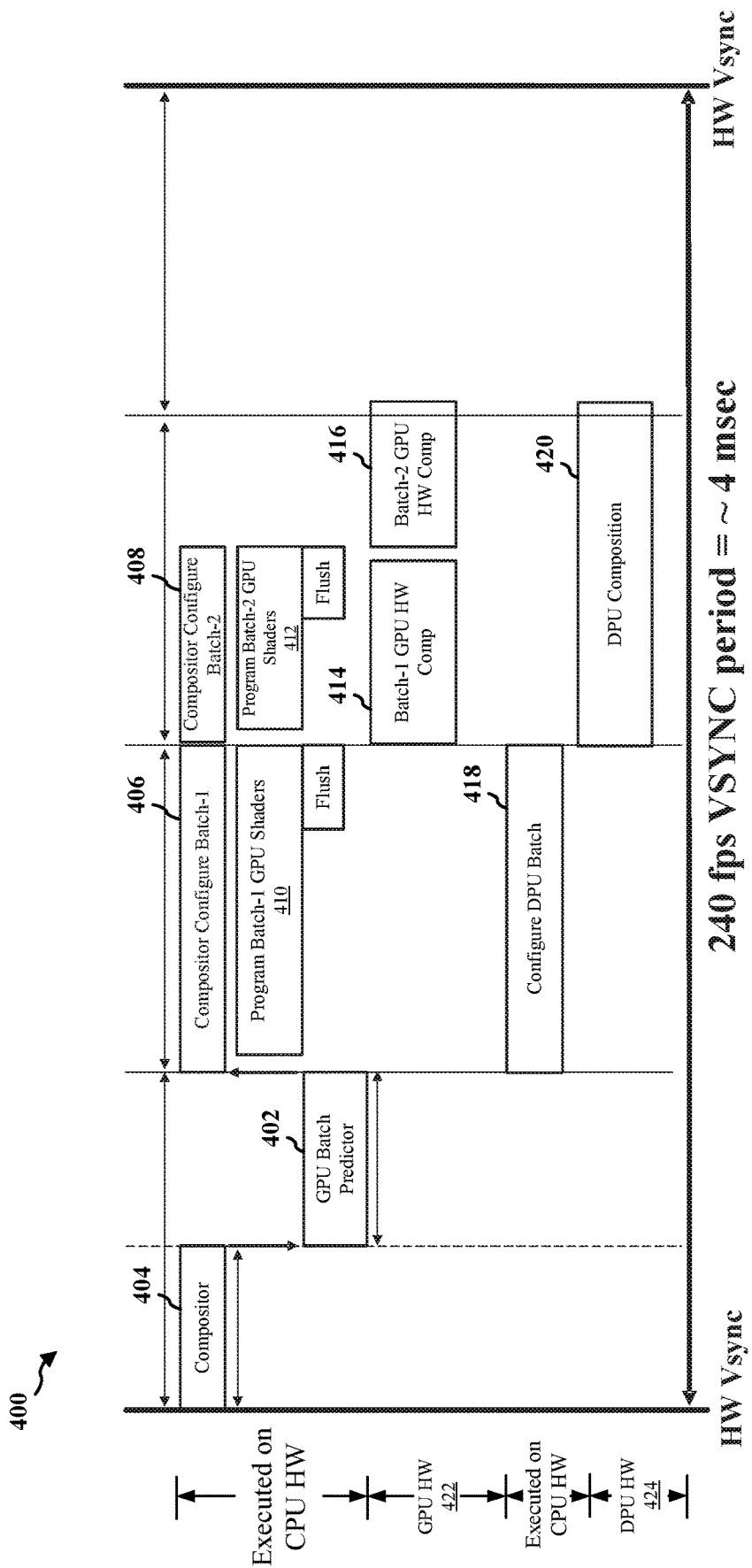
FIG. 4 is a diagram illustrating display composition in accordance with one or more techniques of this disclosure.

FIG. 4 is a diagram 400 illustrating display composition in accordance with one or more techniques of this disclosure. In FIG. 4, the solid vertical lines may indicate a logical split of the vertical synchronization ($V_{SYNC}$) period into 4 equal parts (e.g., each part may be 1 millisecond (ms) long, in case the refresh rate is 240 frames per second (fps)). The horizontal arrows may indicate the time taken by the various illustrated processes. In one or more aspects, the CPU may perform the DPU topology selection 418 (i.e., mapping some application layers to DPU overlay planes) in parallel with configuring 406 (e.g., by the compositor 404) some other application layers for composition at the GPU. Specifically, the CPU may program 410 the GPU shader for composition 414 of certain application layers at the GPU in parallel with selecting 418 specific DPU overlay planes for the DPU eligible application layers. A DPU overlay plane may refer to a unit of DPU hardware resource (e.g., DPU hardware with 4 overlay planes may simultaneously blend 4 layers). The composition 420 at the DPU 424 may also overlap in time with the composition 414 at the GPU 422. If any of the application layers scheduled for composition at the DPU in the first pass are found (e.g., by a compositor backend) to be unsupported by the DPU during topology selection 418, the CPU (e.g., the compositor 404) may configure 408 these application layers as a second batch of application layers to be composited 416 at the GPU, and may schedule 412 the second batch for composition at the GPU. Incorrectly scheduling DPU ineligible application layers for composition at the DPU in the first pass may be rare. In any event, the second batch of application layers for composition at the GPU (which may include the DPU ineligible application layers incorrectly scheduled for DPU composition), if one exists, may be of a much smaller size than the initial batch for composition at the GPU.

In one or more aspects, the GPU batch predictor 402, which may be executed at the CPU, may select the first application layers for composition at the DPU and the second application layers for composition at the GPU batch base on batch prediction heuristics, as described in further detail below. The dotted line in FIG. 4 may indicate the expected timeline where the compositor 404 may call the GPU batch predictor 402 relative to the logic split of the $V_{SYNC}$ period. The vertical arrows may indicate the input/output call sequence from the compositor 404 to the GPU batch predictor 402 and back.

Figure 5:
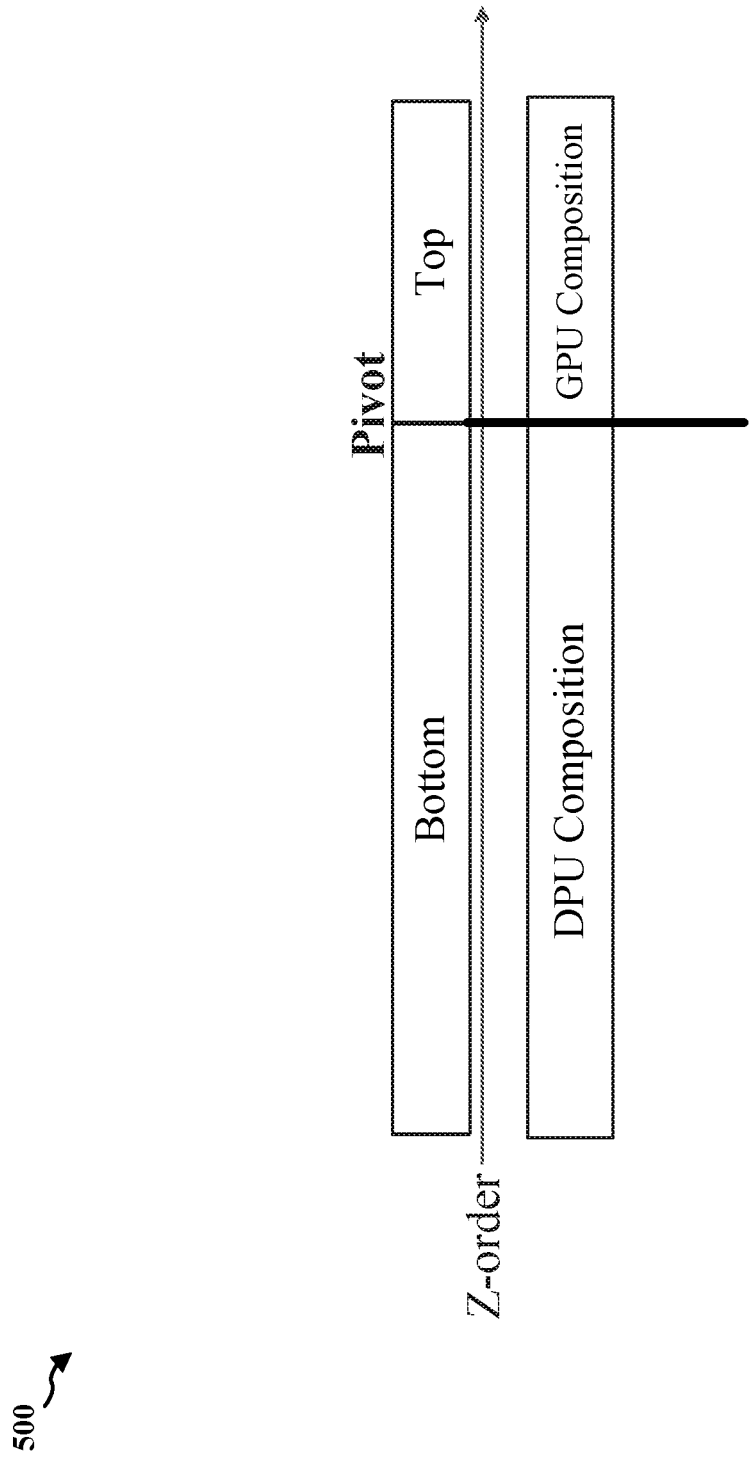
FIG. 5 is a diagram illustrating layer splitting in accordance with one or more techniques of this disclosure.

FIG. 5 is a diagram 500 illustrating layer splitting in accordance with one or more techniques of this disclosure. In one aspect, the first application layers selected for composition at the DPU may be associated with a lower Z order. An application layer with a higher Z order (e.g., toward the top) may be above an overlapping application layer with a lower Z order (e.g., toward the bottom). Application layers associated with a lower Z order (e.g., a wallpaper) may likely be large in size. The DPU may be optimized for larger application layers. Accordingly, application layers associated with a lower Z order may be more suitable for composition at the DPU. In one aspect, the first application layers selected for composition at the DPU may be associated with a higher priority. Application layers associated with a higher priority may include those that are associated with, for example, a camera application, a gaming application, or a high dynamic range (HDR) video application, and so on. In one aspect, the second application layers selected for composition at the GPU may be associated with a higher Z order. Application layers associated with a higher Z order may likely be smaller in size. Because the DPU may not be optimized for smaller application layers, application layers associated with a higher Z order may be more suitable for composition at the GPU. The pivot may indicate the split between the first application layers selected for composition at the DPU and the second application layers selected for composition at the GPU.

In one aspect, the DPU and the GPU execution paths may be parallelized using separate CPU cores (e.g., separate CPU efficiency cores). Because overlay composition is associated with linear complexity with respect to the number of application layers, parallelizing the DPU and the GPU execution paths on separate CPU cores with close-to-even sized batches of application layers may potentially lead to halving of the total execution time.

Referring back to FIG. 4, in one aspect, at the GPU batch predictor 402, the second application layers selected for composition at the GPU may include application layers already marked for composition at the GPU. These may include application layers unsupported at the DPU, such as shadow layers, layers with a null handle, or layers with an invalid rotation (e.g., rotations that are not 90 degrees, 180 degrees, 270 degrees, etc.), and so on. In one aspect, the second application layers selected for composition at the GPU may include application layers that were marked for composition at the GPU in one or more previous rounds. In one aspect, the second application layers selected for composition at the GPU may include new application layers that are associated with a geometry change based on application layers that were marked for composition at the GPU in one or more previous rounds.

In one aspect, the batch prediction heuristics used at the GPU batch predictor 402 for selecting the first application layers and the second application layers may be based on a learning model. The learning model (e.g., based on artificial intelligence techniques) may be trained using mixed mode composition layer splitting decisions made at the compositor backend. The learning model may be trained either online or offline. For example, if in one round, an application layer including an 8× downscale factor is found to be unsupported for composition at the DPU, the result may be used to update the learning model, and the GPU batch predictor 402, based on the learning model, may classify similar application layers as second application layers for composition at the GPU in the future.

In one aspect, the mixed mode composition layer splitting results from the compositor backend may be encoded (e.g., using matrix encoding) before being forwarded to update the learning model. The mixed mode composition layer splitting results may include reasons that cause the application layers to be unsupported for composition at the DPU. For example, the reasons may include pixel format, downscale factor, overlay scarcity, blend stage limit, bandwidth limit, and so on.

Figure 6:
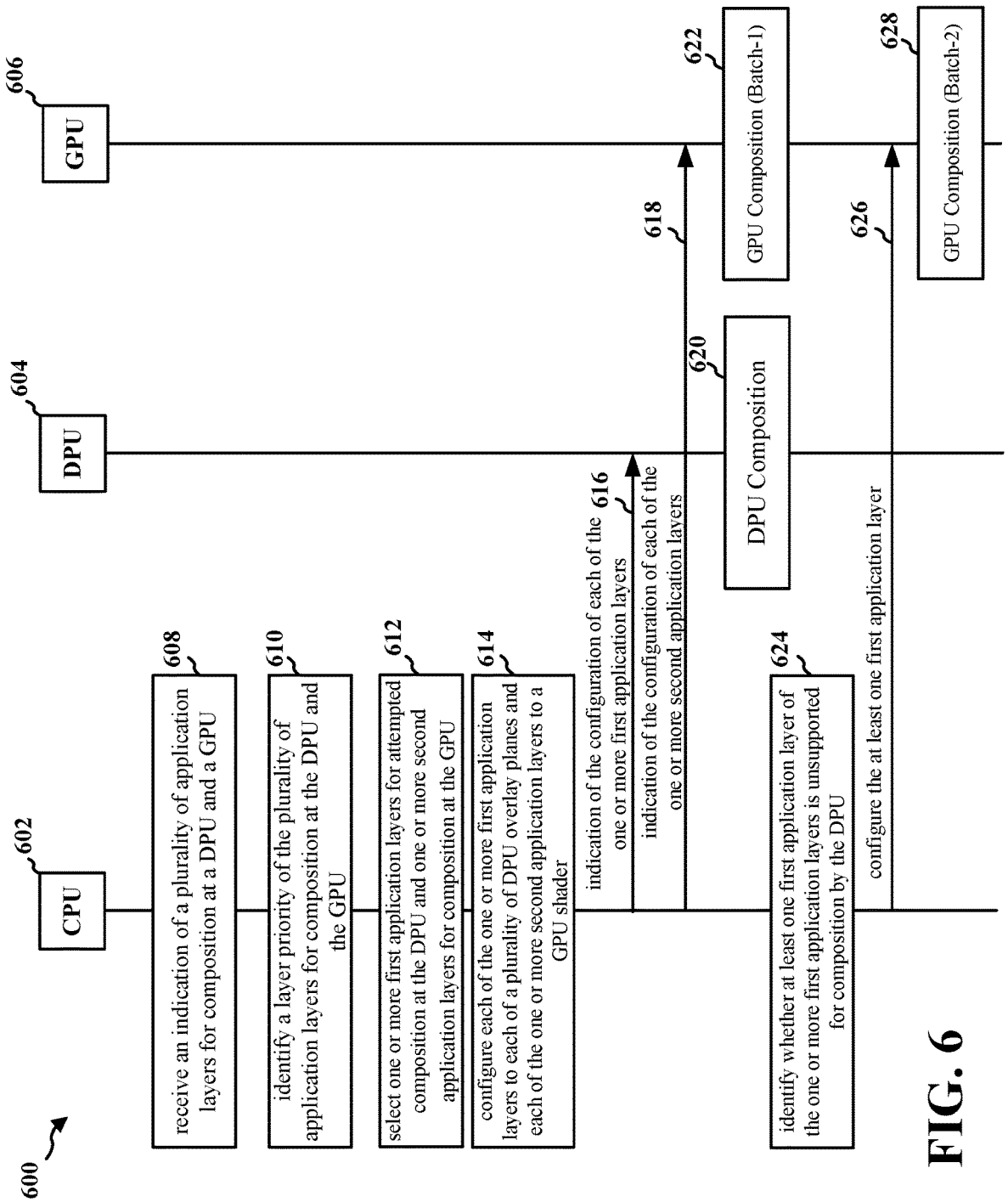
FIG. 6 is a call flow diagram illustrating example communications between a CPU, a display processing unit (DPU), and a GPU in accordance with one or more techniques of this disclosure.

FIG. 6 is a call flow diagram 600 illustrating example communications between a CPU 602, a DPU 604, and a GPU 606 in accordance with one or more techniques of this disclosure. At 608, the CPU 602 may receive an indication of a plurality of application layers for composition at a DPU 604 and a GPU 606. At 610, the CPU 602 may identify a layer priority of the plurality of application layers for composition at the DPU 604 and the GPU 606. At 612, the CPU 602 may select one or more first application layers of the plurality of application layers for attempted composition at the DPU 604 and one or more second application layers of the plurality of application layers for composition at the GPU 606. The selection of the one or more first application layers and the one or more second application layers may be associated with a heuristic process, for example, as described above.

In one configuration, the selection of the one or more first application layers for the attempted composition at the DPU 604 and the one or more second application layers for the composition at the GPU 606 may be based on the layer priority. In particular, the one or more first application layers for the attempted composition at the DPU 604 may correspond to a higher layer priority. The one or more second application layers for the composition at the GPU 606 may correspond to a lower layer priority. At least some of the one or more first application layers corresponding to the higher layer priority may correspond to a larger layer size or a high priority application compared to at least some of the one or more second application layers corresponding to the lower layer priority. At least some of the one or more first application layers corresponding to the higher layer priority may correspond to at least one of a camera application, a gaming application, or an HDR video application.

In one configuration, the selection of the one or more first application layers and the one or more second application layers may be based on an order or ranking (e.g., Z order) of the plurality of application layers. The one or more first application layers for the attempted composition at the DPU 604 may correspond to a lower order or ranking (e.g., a lower Z order). The one or more second application layers for the composition at the GPU 606 may correspond to a higher order or ranking (e.g., a higher Z order).

In one configuration, the selection of the one or more first application layers and the one or more second application layers may be based on at least one prior composition of the plurality of application layers at the DPU 604 and the GPU 606.

In one configuration, at least some of the one or more second application layers may be prespecified (marked) for composition at the GPU.

At 614, the CPU 602 may configure each of the one or more first application layers to each of a plurality of DPU 604 overlay planes and each of the one or more second application layers to a GPU 606 shader. Composition of at least some of the one or more first application layers at the plurality of DPU 604 overlay planes may at least partially overlap in time with composition of at least some of the one or more second application layers at the GPU 606 shader. Configuration of the one or more first application layers to the plurality of DPU overlay planes may overlap in time with configuration of the one or more second application layers to the GPU shader.

At 616, the CPU 602 may transmit, to the DPU 604, an indication of the configuration of each of the one or more first application layers to each of the plurality of DPU 604 overlay planes. At 618, the CPU 602 may transmit, to the GPU 606, an indication of the configuration of each of the one or more second application layers to the GPU 606 shader. At 620, the DPU 604 may compose one or more first application layers. At 622, the GPU 606 may compose one or more second application layers. The one or more second application layers may correspond to the first batch of application layers for composition at the GPU. At 624, the CPU 602 may identify at least one first application layer of the one or more first application layers is unsupported for composition by the DPU 604. At 626, if any layers were incorrectly selected, the CPU may configure the at least one first application layer (that was incorrectly selected for the attempted composition at the DPU 604) to the GPU 606 shader. At 628, if any layers were incorrectly selected, the GPU 606 may compose the at least one first application layer (that was incorrectly selected for the attempted composition at the DPU 604). The at least one first application layer may correspond to the second batch of application layers for composition at the GPU 606.

The plurality of DPU 604 overlay planes may correspond to an output of a DPU 604 composition. The GPU 606 shader may correspond to an output of a GPU 606 composition.

Figure 7:
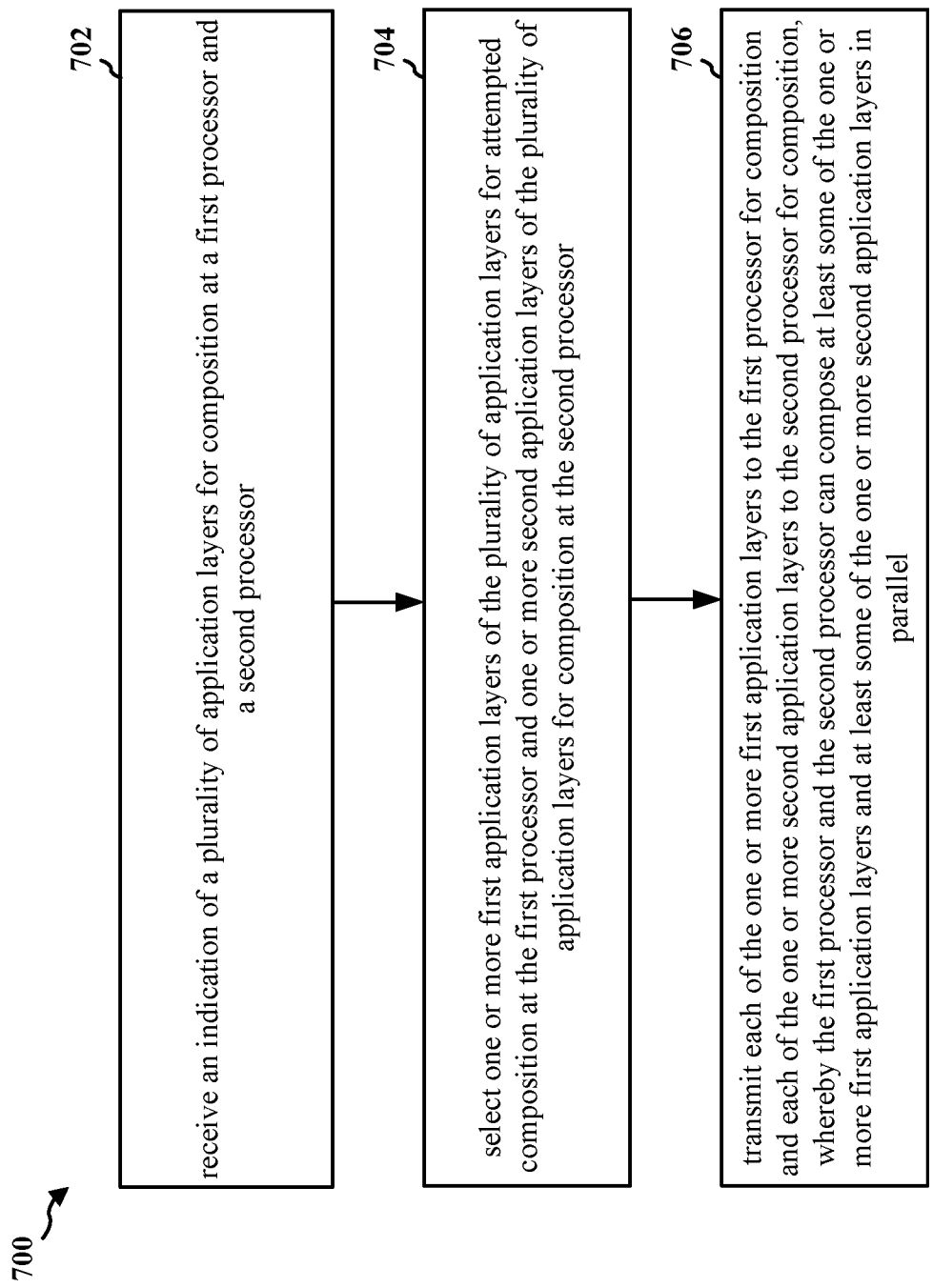
FIG. 7 is a flowchart of an example method of display processing in accordance with one or more techniques of this disclosure.

FIG. 7 is a flowchart 700 of an example method of display processing in accordance with one or more techniques of this disclosure. The method may be performed by an apparatus, such as an apparatus for display processing, a CPU, a wireless communication device, and the like, as used in connection with the aspects of FIGS. 1, 2, and 4-6.

At 702, the apparatus may receive an indication of a plurality of application layers for composition at a first processor and a second processor. For example, referring to FIG. 6, at 608, the CPU 602 may receive an indication of a plurality of application layers for composition at a first processor 604 and a second processor 606. Further, processing unit 120 in FIG. 1 may perform step 702.

At 704, the apparatus may select one or more first application layers of the plurality of application layers for attempted composition at the first processor and one or more second application layers of the plurality of application layers for composition at the second processor. For example, referring to FIG. 6, at 612, the CPU 602 may select one or more first application layers of the plurality of application layers for attempted composition at the first processor 604 and one or more second application layers of the plurality of application layers for composition at the second processor 606. Further, processing unit 120 in FIG. 1 may perform step 704.

At 706, the apparatus may transmit each of the one or more first application layers to the first processor for composition and each of the one or more second application layers to the second processor for composition. The first processor and the second processor man compose at least some of the one or more first application layers and at least some of the one or more second application layers in parallel. For example, referring to FIG. 6, at 614, the CPU 602 may transmit each of the one or more first application layers to the first processor 604 for composition and each of the one or more second application layers to the second processor 606 for composition. Further, processing unit 120 in FIG. 1 may perform step 706.

Figure 8:
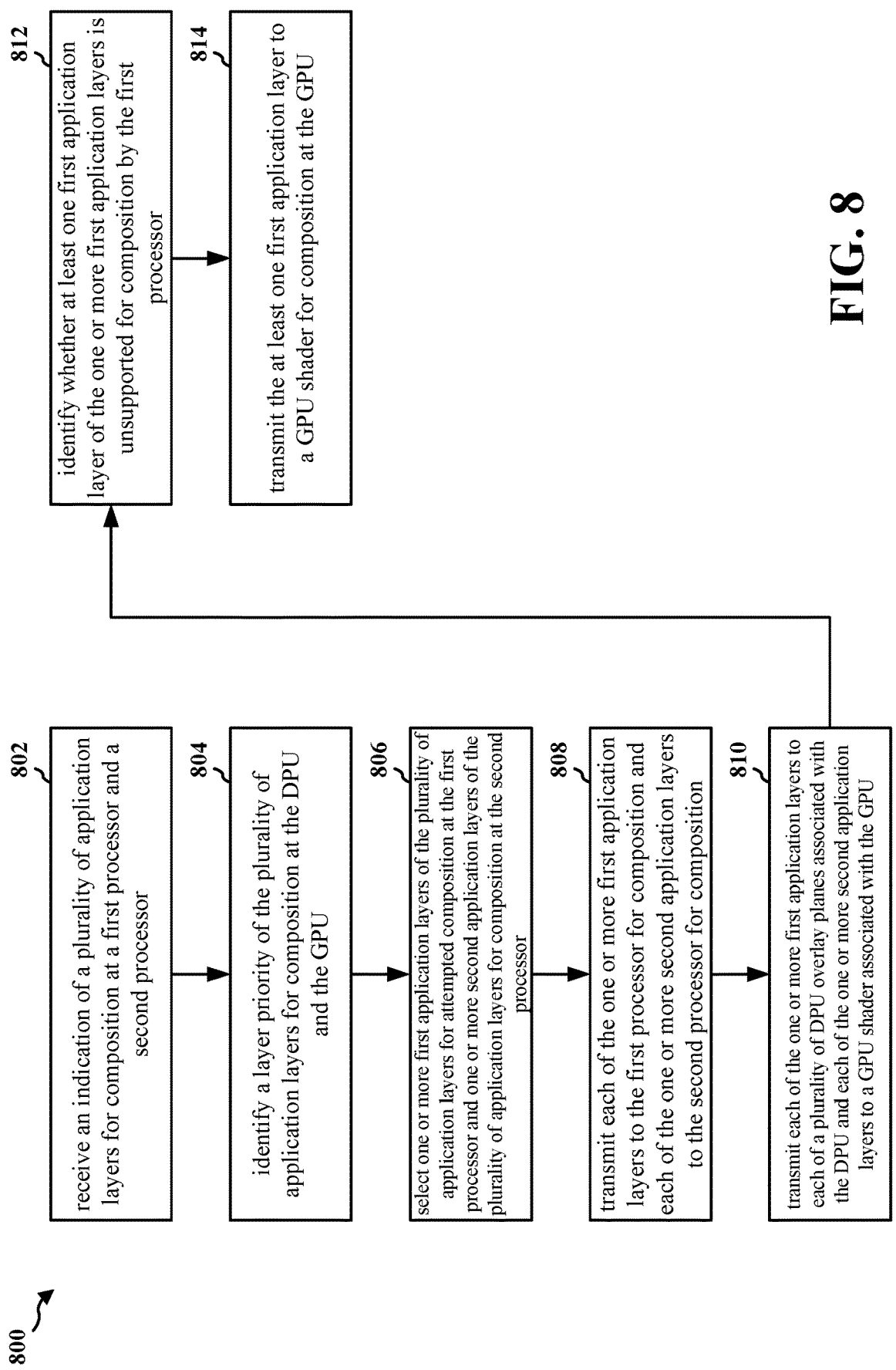
FIG. 8 is a flowchart of an example method of display processing in accordance with one or more techniques of this disclosure.

FIG. 8 is a flowchart 800 of an example method of display processing in accordance with one or more techniques of this disclosure. The method may be performed by an apparatus, such as an apparatus for display processing, a CPU, a wireless communication device, and the like, as used in connection with the aspects of FIGS. 1, 2, and 4-6.

At 802, the apparatus may receive an indication of a plurality of application layers for composition at a first processor and a second processor. For example, referring to FIG. 6, at 608, the CPU 602 may receive an indication of a plurality of application layers for composition at a first processor 604 and a second processor 606. Further, processing unit 120 in FIG. 1 may perform step 802.

In one configuration, the first processor may be a DPU. The second processor may be a GPU.

At 804, the apparatus may identify a layer priority of the plurality of application layers for composition at the DPU and the GPU. The selection of the one or more first application layers for the attempted composition at the DPU and the one or more second application layers for the composition at the GPU may be based on the layer priority. For example, referring to FIG. 6, at 610, the CPU 602 may identify a layer priority of the plurality of application layers for composition at the DPU and the GPU. Further, processing unit 120 in FIG. 1 may perform step 804.

At 806, the apparatus may select one or more first application layers of the plurality of application layers for attempted composition at the first processor and one or more second application layers of the plurality of application layers for composition at the second processor. For example, referring to FIG. 6, at 612, the CPU 602 may select one or more first application layers of the plurality of application layers for attempted composition at the first processor 604 and one or more second application layers of the plurality of application layers for composition at the second processor 606. Further, processing unit 120 in FIG. 1 may perform step 806.

In one configuration, the one or more first application layers for the attempted composition at the DPU may correspond to a higher layer priority and the one or more second application layers for the composition at the GPU may correspond to a lower layer priority.

In one configuration, at least some of the one or more first application layers corresponding to the higher layer priority may correspond to at least one of a camera application, a gaming application, or an HDR video application.

In one configuration, at least some of the one or more first application layers corresponding to the higher layer priority may correspond to a larger layer size or a high priority application compared to at least some of the one or more second application layers corresponding to the lower layer priority.

In one configuration, the selection of the one or more first application layers and the one or more second application layers may be based on an order or ranking of the plurality of application layers. The one or more first application layers for the attempted composition at the DPU may correspond to a lower order or ranking and the one or more second application layers for the composition at the GPU may correspond to a higher order or ranking.

In one configuration, the selection of the one or more first application layers and the one or more second application layers may be associated with a heuristic process or a machine learning process.

In one configuration, the selection of the one or more first application layers and the one or more second application layers may be based on at least one prior composition of the plurality of application layers at the DPU and the GPU.

In one configuration, at least some of the one or more second application layers may be prespecified for composition at the GPU.

At 808, the apparatus may transmit each of the one or more first application layers to the first processor for composition and each of the one or more second application layers to the second processor for composition. The first processor and the second processor man compose at least some of the one or more first application layers and at least some of the one or more second application layers in parallel. For example, referring to FIGS. 6, at 614, 616, and 618, the CPU 602 may transmit each of the one or more first application layers to the first processor 604 for composition and each of the one or more second application layers to the second processor 606 for composition. Further, processing unit 120 in FIG. 1 may perform step 808.

At 810, the apparatus may transmit each of the one or more first application layers to each of a plurality of DPU overlay planes associated with the DPU and each of the one or more second application layers to a GPU shader associated with the GPU. For example, referring to FIGS. 6, at 616 and 618, the CPU 602 may transmit each of the one or more first application layers to each of a plurality of DPU overlay planes associated with the DPU 604 and each of the one or more second application layers to a GPU shader associated with the GPU 606. Further, processing unit 120 in FIG. 1 may perform step 810.

In one configuration, transmission of the one or more first application layers to the plurality of DPU overlay planes may overlap in time with transmission of the one or more second application layers to the GPU shader.

In one configuration, the plurality of DPU overlay planes may correspond to an output of a DPU composition. The GPU shader may correspond to an output of a GPU composition.

At 812, the apparatus may identify whether at least one first application layer of the one or more first application layers is unsupported for composition by the first processor. For example, referring to FIG. 6, at 624, the CPU 602 may identify whether at least one first application layer of the one or more first application layers is unsupported for composition by the first processor 604. Further, processing unit 120 in FIG. 1 may perform step 812.

At 814, the apparatus may transmit the at least one first application layer to a GPU shader for composition at the GPU. The at least one first application layer may be transmitted to the GPU shader after the selection of the one or more first application layers for the attempted composition at the DPU. The one or more second application layers for the composition at the GPU may correspond to a first batch of application layers for composition at the GPU, and the at least one first application layer may correspond to a second batch of application layers for composition at the GPU. For example, referring to FIG. 6, at 626, the CPU 602 may transmit the at least one first application layer to a GPU shader for composition at the GPU 606. Further, processing unit 120 in FIG. 1 may perform step 814.

In configurations, a method or an apparatus for display processing is provided. The apparatus may be a CPU or some other processor that may perform display processing. In aspects, the apparatus may be the processing unit 120 within the device 104, or may be some other hardware within the device 104 or another device. The apparatus may include means for receiving an indication of a plurality of application layers for composition at a first processor and a second processor. The apparatus may further include means for selecting one or more first application layers of the plurality of application layers for attempted composition at the first processor and one or more second application layers of the plurality of application layers for composition at the second processor. The apparatus may further include means for transmitting each of the one or more first application layers to the first processor for composition and each of the one or more second application layers to the second processor for composition. The first processor and the second processor can compose at least some of the one or more first application layers and at least some of the one or more second application layers in parallel.

In one configuration, the first processor may be a DPU. The second processor may be a GPU. In one configuration, the apparatus may further include means for identifying a layer priority of the plurality of application layers for composition at the DPU and the GPU. The selection of the one or more first application layers for the attempted composition at the DPU and the one or more second application layers for the composition at the GPU may be based on the layer priority. In one configuration, the one or more first application layers for the attempted composition at the DPU may correspond to a higher layer priority and the one or more second application layers for the composition at the GPU may correspond to a lower layer priority. In one configuration, at least some of the one or more first application layers corresponding to the higher layer priority may correspond to at least one of a camera application, a gaming application, or an HDR video application. In one configuration, at least some of the one or more first application layers corresponding to the higher layer priority may correspond to a larger layer size or a high priority application compared to at least some of the one or more second application layers corresponding to the lower layer priority. In one configuration, the selection of the one or more first application layers and the one or more second application layers may be based on an order or ranking of the plurality of application layers. The one or more first application layers for the attempted composition at the DPU may correspond to a lower order or ranking and the one or more second application layers for the composition at the GPU may correspond to a higher order or ranking. In one configuration, the selection of the one or more first application layers and the one or more second application layers may be associated with a heuristic process or a machine learning process. In one configuration, the selection of the one or more first application layers and the one or more second application layers may be based on at least one prior composition of the plurality of application layers at the DPU and the GPU. In one configuration, at least some of the one or more second application layers may be prespecified for composition at the GPU. In one configuration, the apparatus may further include means for transmitting each of the one or more first application layers to each of a plurality of DPU overlay planes associated with the DPU and each of the one or more second application layers to a GPU shader associated with the GPU. In one configuration, transmission of the one or more first application layers to the plurality of DPU overlay planes may overlap in time with transmission of the one or more second application layers to the GPU shader. In one configuration, the plurality of DPU overlay planes may correspond to an output of a DPU composition, and the GPU shader may correspond to an output of a GPU composition. In one configuration, the apparatus may further include means for identifying whether at least one first application layer of the one or more first application layers is unsupported for composition by the first processor. In one configuration, the apparatus may further include means for transmitting the at least one first application layer to a GPU shader for composition at the GPU. The at least one first application layer may be transmitted to the GPU shader after the selection of the one or more first application layers for the attempted composition at the DPU. The one or more second application layers for the composition at the GPU may correspond to a first batch of application layers for composition at the GPU. The at least one first application layer may correspond to a second batch of application layers for composition at the GPU. In one configuration, the apparatus may be a wireless communication device.

Accordingly, a significant reduction in the time for mixed mode composition in each round may be achieved without using additional hardware. Composition at very high refresh rates (e.g., 240 Hz or above) may be supported without placing undue processing demands on the CPU. The saved CPU processing resources may be directed to other purposes (e.g., application rendering). CPU efficiency cores may be sufficient for the composition, even at very high refresh rates. CPU performance cores, which may be a scarce source, may be dedicated to more valuable tasks.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing including at least one processor coupled to a memory and configured to receive an indication of a plurality of application layers for composition at a first processor and a second processor; select one or more first application layers of the plurality of application layers for attempted composition at the first processor and one or more second application layers of the plurality of application layers for composition at the second processor; and transmit each of the one or more first application layers to the first processor for composition and each of the one or more second application layers to the second processor for composition, whereby the first processor and the second processor can compose at least some of the one or more first application layers and at least some of the one or more second application layers in parallel.

Aspect 2 may be combined with aspect 1 and that the first processor is a DPU, and the second processor is a GPU.

Aspect 3 may be combined with aspect 2 and the at least one processor is further configured to: identify a layer priority of the plurality of application layers for composition at the DPU and the GPU, wherein the selection of the one or more first application layers for the attempted composition at the DPU and the one or more second application layers for the composition at the GPU is based on the layer priority.

Aspect 4 may be combined with any of aspects 2 and 3 and that the one or more first application layers for the attempted composition at the DPU correspond to a higher layer priority and the one or more second application layers for the composition at the GPU correspond to a lower layer priority.

Aspect 5 may be combined with aspect 4 and that at least some of the one or more first application layers corresponding to the higher layer priority correspond to at least one of a camera application, a gaming application, or an HDR video application.

Aspect 6 may be combined with any of aspects 4 and 5 and that at least some of the one or more first application layers corresponding to the higher layer priority correspond to a larger layer size or a high priority application compared to at least some of the one or more second application layers corresponding to the lower layer priority.

Aspect 7 may be combined with any of aspects 2-6 and that the selection of the one or more first application layers and the one or more second application layers is based on an order or ranking of the plurality of application layers, and the one or more first application layers for the attempted composition at the DPU correspond to a lower order or ranking and the one or more second application layers for the composition at the GPU correspond to a higher order or ranking.

Aspect 8 may be combined with any of aspects 2-7 and that the selection of the one or more first application layers and the one or more second application layers is associated with a heuristic process or a machine learning process.

Aspect 9 may be combined with any of aspects 2-8 and that the selection of the one or more first application layers and the one or more second application layers is based on at least one prior composition of the plurality of application layers at the DPU and the GPU.

Aspect 10 may be combined with any of aspects 2-9 and that at least some of the one or more second application layers are prespecified for composition at the GPU.

Aspect 11 may be combined with any of aspects 2-10 and the at least one processor is further configured to: transmit each of the one or more first application layers to each of a plurality of DPU overlay planes associated with the DPU and each of the one or more second application layers to a GPU shader associated with the GPU.

Aspect 12 may be combined with aspect 11 and that transmission of the one or more first application layers to the plurality of DPU overlay planes overlaps in time with transmission of the one or more second application layers to the GPU shader.

Aspect 13 may be combined with any of aspects 11 and 12 and that the plurality of DPU overlay planes correspond to an output of a DPU composition, and the GPU shader corresponds to an output of a GPU composition.

Aspect 14 may be combined with any of aspects 2-13 and the at least one processor is further configured to: identify whether at least one first application layer of the one or more first application layers is unsupported for composition by the first processor.

Aspect 15 may be combined with aspect 14 and the at least one processor is further configured to: transmit the at least one first application layer to a GPU shader for composition at the GPU, and that the at least one first application layer is transmitted to the GPU shader after the selection of the one or more first application layers for the attempted composition at the DPU, the one or more second application layers for the composition at the GPU correspond to a first batch of application layers for composition at the GPU, and the at least one first application layer corresponds to a second batch of application layers for composition at the GPU.

Aspect 16 may be combined with any of aspects 1-15 and that the apparatus is a wireless communication device.

Aspect 17 is a method for display processing for implementing any of aspects 1-16.

Aspect 18 is an apparatus for display processing including means for implementing a method as in any of aspects 1-16.

Aspect 19 is a computer-readable medium storing computer executable code, the code when executed by at least one processor causes the at least one processor to implement a method as in any of aspects 1-16.

Various aspects have been described herein. These and other aspects are within the scope of the following claims.

What is claimed is:

1. An apparatus for display processing, comprising:
a memory; and
at least one processor coupled to the memory and configured to:
receive an indication of a plurality of application layers for composition at a first processor and a second processor;
select one or more first application layers of the plurality of application layers for attempted composition at the first processor and one or more second application layers of the plurality of application layers for composition at the second processor;
after the selection of the one or more first application layers of the plurality of application layers for attempted composition at the first processor, identify that at least one first application layer of the one or more first application layers is unsupported for composition by the first processor; and
transmit at least one second application layer of the one or more first application layers to the first processor for composition and each of the one or more second application layers and each of the at least one first application layer that is unsupported for composition by the first processor to the second processor for composition, whereby the first processor and the second processor can compose at least some of the one or more first application layers and at least some of the one or more second application layers in parallel and the at least one first application layer that is unsupported is configured to be scheduled for composition after the one or more second application layers.

2. The apparatus of claim 1, wherein the first processor is a display processing unit (DPU), and the second processor is a graphics processing unit (GPU).

3. The apparatus of claim 2, the at least one processor being further configured to:
identify a layer priority of the plurality of application layers for composition at the DPU and the GPU, wherein the selection of the one or more first application layers for the attempted composition at the DPU and the one or more second application layers for the composition at the GPU is based on the layer priority.

4. The apparatus of claim 2, wherein the one or more first application layers for the attempted composition at the DPU correspond to a higher layer priority and the one or more second application layers for the composition at the GPU correspond to a lower layer priority.

5. The apparatus of claim 4, wherein at least some of the one or more first application layers corresponding to the higher layer priority correspond to at least one of a camera application, a gaming application, or a high dynamic range (HDR) video application.

6. The apparatus of claim 4, wherein at least some of the one or more first application layers corresponding to the higher layer priority correspond to a larger layer size or a high priority application compared to at least some of the one or more second application layers corresponding to the lower layer priority.

7. The apparatus of claim 2, wherein the selection of the one or more first application layers and the one or more second application layers is based on an order or ranking of the plurality of application layers, and the one or more first application layers for the attempted composition at the DPU correspond to a lower order or ranking and the one or more second application layers for the composition at the GPU correspond to a higher order or ranking.

8. The apparatus of claim 2, wherein the selection of the one or more first application layers and the one or more second application layers is associated with a heuristic process or a machine learning process.

9. The apparatus of claim 2, wherein the selection of the one or more first application layers and the one or more second application layers is based on at least one prior composition of the plurality of application layers at the DPU and the GPU.

10. The apparatus of claim 2, wherein at least some of the one or more second application layers are prespecified for composition at the GPU.

11. The apparatus of claim 2, the at least one processor being further configured to:
transmit each of the one or more first application layers to each of a plurality of DPU overlay planes associated with the DPU and each of the one or more second application layers to a GPU shader associated with the GPU.

12. The apparatus of claim 11, wherein transmission of the one or more first application layers to the plurality of DPU overlay planes overlaps in time with transmission of the one or more second application layers to the GPU shader.

13. The apparatus of claim 11, wherein the plurality of DPU overlay planes correspond to an output of a DPU composition, and the GPU shader corresponds to an output of a GPU composition.

14. The apparatus of claim 1, wherein to transmit each of the at least one first application layer that is unsupported for composition by the first processor to the second processor, the at least one processor is further configured to:
transmit each of the at least one first application layer to a GPU shader for composition at the GPU.

15. The apparatus of claim 1, wherein the apparatus is a wireless communication device.

16. A method of display processing, comprising:
receiving an indication of a plurality of application layers for composition at a first processor and a second processor;
selecting one or more first application layers of the plurality of application layers for attempted composition at the first processor and one or more second application layers of the plurality of application layers for composition at the second processor;
after selecting the one or more first application layers of the plurality of application layers for attempted composition at the first processor, identifying that at least one first application layer of the one or more first application layers is unsupported for composition by the first processor; and transmitting at least one second application layer of the one or more first application layers to the first processor for composition and each of the one or more second application layers and each of the at least one first application layer that is unsupported for composition by the first processor to the second processor for composition, whereby the first processor and the second processor can compose at least some of the one or more first application layers and at least some of the one or more second application layers in parallel and the at least one first application layer that is unsupported is scheduled for composition after the one or more second application layers.

17. The method of claim 16, wherein the first processor is a display processing unit (DPU), and the second processor is a graphics processing unit (GPU).

18. The method of claim 17, further comprising:
identifying a layer priority of the plurality of application layers for composition at the DPU and the GPU, wherein the selection of the one or more first application layers for the attempted composition at the DPU and the one or more second application layers for the composition at the GPU is based on the layer priority.

19. The method of claim 17, wherein the one or more first application layers for the attempted composition at the DPU correspond to a higher layer priority and the one or more second application layers for the composition at the GPU correspond to a lower layer priority.

20. The method of claim 19, wherein at least some of the one or more first application layers corresponding to the higher layer priority correspond to at least one of a camera application, a gaming application, or a high dynamic range (HDR) video application.

21. The method of claim 19, wherein at least some of the one or more first application layers corresponding to the higher layer priority correspond to a larger layer size or a high priority application compared to at least some of the one or more second application layers corresponding to the lower layer priority.

22. The method of claim 17, wherein the selection of the one or more first application layers and the one or more second application layers is based on an order or ranking of the plurality of application layers, and the one or more first application layers for the attempted composition at the DPU correspond to a lower order or ranking and the one or more second application layers for the composition at the GPU correspond to a higher order or ranking.

23. The method of claim 17, wherein the selection of the one or more first application layers and the one or more second application layers is associated with a heuristic process or a machine learning process.

24. The method of claim 17, wherein the selection of the one or more first application layers and the one or more second application layers is based on at least one prior composition of the plurality of application layers at the DPU and the GPU.

25. The method of claim 17, wherein at least some of the one or more second application layers are prespecified for composition at the GPU.

26. The method of claim 17, further comprising:
transmitting each of the one or more first application layers to each of a plurality of DPU overlay planes associated with the DPU and each of the one or more second application layers to a GPU shader associated with the GPU.

27. The method of claim 26, wherein transmission of the one or more first application layers to the plurality of DPU overlay planes overlaps in time with transmission of the one or more second application layers to the GPU shader.

28. The method of claim 26, wherein the plurality of DPU overlay planes correspond to an output of a DPU composition, and the GPU shader corresponds to an output of a GPU composition.

29. The method of claim 16, wherein transmitting each of the at least one first application layer that is unsupported for composition by the first processor to the second processor comprises:
transmitting each of the at least one first application layer to a GPU shader for composition at the GPU.

30. A non-transitory computer-readable medium storing computer executable code, the code when executed by at least one processor, causes the at least one processor to:
receive an indication of a plurality of application layers for composition at a first processor and a second processor;
select one or more first application layers of the plurality of application layers for attempted composition at the first processor and one or more second application layers of the plurality of application layers for composition at the second processor;
after the selection of the one or more first application layers of the plurality of application layers for attempted composition at the first processor, identify that at least one first application layer of the one or more first application layers is unsupported for composition by the first processor; and
transmit at least one second application layer of the one or more first application layers to the first processor for composition and each of the one or more second application layers and each of the at least one first application layer that is unsupported for composition by the first processor to the second processor for composition, whereby the first processor and the second processor can compose at least some of the one or more first application layers and at least some of the one or more second application layers in parallel and the at least one first application layer that is unsupported is configured to be scheduled for composition after the one or more second application layers.

* * * * *